(12) United States Patent
Ko

(10) Patent No.: US 7,978,350 B2
(45) Date of Patent: Jul. 12, 2011

(54) COPYRIGHT COMPLIANCE

(75) Inventor: Anthony Hok Tsung Ko, Silvania Waters (AU)

(73) Assignee: Canon Information Systems Research Australia Pty. Ltd., North Ryde, New South Wales (AU)

( * ) Notice: Subject to any disclaimer, the term of this patent is extended or adjusted under 35 U.S.C. 154(b) by 919 days.

(21) Appl. No.: 11/933,589

(22) Filed: Nov. 1, 2007

(65) Prior Publication Data

US 2008/0106772 A1 May 8, 2008

(30) Foreign Application Priority Data

Nov. 6, 2006 (AU) ................................ 2006235881

(51) Int. Cl.
*G06F 3/12* (2006.01)
(52) U.S. Cl. ........................................ 358/1.13; 358/1.9
(58) Field of Classification Search .................. 358/1.18, 358/468, 1.13, 474, 471, 1.9
See application file for complete search history.

(56) References Cited

U.S. PATENT DOCUMENTS

| | | | |
|---|---|---|---|
| 5,717,381 A * | 2/1998 | Jagielinski et al. | 340/551 |
| 6,972,865 B1 * | 12/2005 | Muramatsu | 358/1.2 |
| 7,832,635 B2 * | 11/2010 | Owaku | 235/382 |
| 2001/0017712 A1 * | 8/2001 | Kasatani | 358/1.15 |
| 2004/0035934 A1 * | 2/2004 | Miyazawa et al. | 235/454 |
| 2005/0157320 A1 * | 7/2005 | Sako et al. | 358/1.12 |
| 2006/0059061 A1 * | 3/2006 | Oey | 705/35 |
| 2007/0278703 A1 * | 12/2007 | Hardy et al. | 264/1.37 |
| 2009/0006327 A1 * | 1/2009 | Pamp | 707/3 |
| 2009/0070317 A1 * | 3/2009 | Cooper | 707/5 |
| 2009/0234688 A1 * | 9/2009 | Masuyama et al. | 705/7 |

* cited by examiner

*Primary Examiner* — Jerome Grant, II
(74) *Attorney, Agent, or Firm* — Fitzpatrick, Cella, Harper & Scinto

(57) ABSTRACT

A method for use in reproducing pages from at least one document. The method includes, in a document processing device, determining an identity of the at least one document, and scanning at least some of the pages of the at least one document. The document processing device then displays a representation of a number of the scanned pages to allow selection of at least some of the scanned pages for reproduction and controls the selection of pages for reproduction at least in part using a rule indicative of copyright that is determined based on the identity.

25 Claims, 10 Drawing Sheets

| Copyright metadata entry | |
|---|---|
| ISBN | 0123456789 |
| Title | "Title 1" |
| Author | Joe Bloggs |
| Edition/Issue No. | 5$^{th}$ Edition |
| Publisher | Bloggs Publishing |
| Total pages | 422 |

Fig. 6A

| Copyright usage information entry | |
|---|---|
| Name | Norm Smith |
| ISBN | 0123456789 |
| Pages copied | 34 |
| Number of copies | 100 |
| Mode of use | Educational |

COPYRIGHT COMPLIANCE

FIELD OF THE INVENTION

The present invention relates to a method and apparatus for use in reproducing pages, and in particular to a method and apparatus for allowing copyright compliance.

DESCRIPTION OF THE BACKGROUND ART

The reference in this specification to any prior publication (or information derived from it), or to any matter which is known, is not, and should not be taken as an acknowledgment or admission or any form of suggestion that the prior publication (or information derived from it) or known matter forms part of the common general knowledge in the field of endeavour to which this specification relates.

The reprographic device (photocopiers, scanners, digital copiers, etc.) has provided a convenient means for creating reproductions of hardcopy documents but has also led to the reproduction of materials that are either prohibited from copying or must be copied in a controlled manner, for example, material subject to copyright. Generally, reprographics devices do not have in-built functionality for calculating royalties to be paid to copyright owners when a copyright document is reproduced.

One option for organisations to eliminate their legal liability, and ensure compliance with copyright requirements, is to obtain a blanket license from a Copyright Agent (typically a not-for-profit, Government-owned organisation who ensures that the royalties are paid to the copyright owners). Such a license grants the licensee the permission to create reproductions under certain regulations in return for a fee. The fee is calculated based on an audit which takes a sample of locations over a specified period in order to estimate the likely usage over the entire contract period. This is done primarily because it would be far too expensive and resource intensive to audit the entire period. However, this still requires the use of manual procedures to ensure copyright compliance.

The terms of the license are often complex and contain a number of compliance rules. A common example of a compliance rule is the copy limit restriction that applies to a copyright document. Under this rule, a user may only reproduce up to a fixed percentage or portion of the document.

One approach to tracking copyright includes augmenting the existing device with additional hardware that has the ability to capture and store bibliographical information and an associated counter for tracking the number of reproductions made. However, this method does not process the bibliographical information immediately at the device to retrieve copyright rules for the material to be reproduced or perform any verification on the copy. Consequently, the user is not notified of any potential breach of copyright before the reproduction is made. There is no intermediate step for the user to review, approve and receive notifications of potential copyright breach so that the job may be modified or cancelled. Thus, the user must ensure copyright compliance before making the reproduction which may be time-consuming.

Another approach is to notify a central facility of an intention to copy documents, so that the facility can pre-approve the copying, scan and store the copyright materials. The disadvantage of this technique is that it introduces a significant time delay into the process. Thus, for example, a user may scan a document, seek approval and then print once approval is provided. However, under this scenario, the user is not given the opportunity to correct any errors at the point of scanning, for instance deleting a scan or scanning additional pages. Given an error notification from the approver of copyright compliance, the user must then return to the device, re-scan and re-submit the job.

Hence, there is a need for a simple method for extending the functionality of a reprographics device to ensure compliance with copyright.

Multi-function print devices (MFDs) are devices that integrate a number of hard-copy document handling functions, such as facsimile transceiver, scanner, copier and printer, in a single device. MFDs have become commonplace in the modern office environment and find particular application in the so-called "home office" where the need for each function often exists but the workload for each function does not justify a stand-alone or dedicated device.

With the recent advancements in reprographic devices, such as MFDs, it is possible to deploy and run complex applications on the device. Network connectivity is also a common feature of MFDs. Such devices include a touch panel which can render graphics such as dialog boxes, buttons, JPEG images, and text fields for input. It is also possible to attach and interface with USB devices (e.g. card readers, barcode readers) to extend the functionality of the MFD (or this can be built-in to the hardware). This is generally a better option than adding hardware as it is cheaper and also facilitates customization.

SUMMARY OF THE PRESENT INVENTION

It is an object of the present invention to substantially overcome, or at least ameliorate, one or more disadvantages of existing arrangements.

In a first broad form the present invention provides a method for use in reproducing pages from at least one document, the method including, in a document processing device:
   a) determining an identity of the at least one document;
   b) displaying a representation of a number of scanned pages to allow selection of at least some of the scanned pages for reproduction, the scanned pages being determined by scanning at least some of the pages of the at least one document; and,
   c) controlling the selection of pages for reproduction at least in part using a rule indicative of copyright that is determined based on the identity.

In a second broad form the present invention provides apparatus for reproduction selected pages from at least one document, the apparatus including a document processing device for:
   a) determining an identity of the at least one document;
   b) displaying a representation of a number of scanned pages to allow selection of at least some of the scanned pages for reproduction, the scanned pages being determined by scanning at least some of the pages of the at least one document; and,
   c) controlling the selection of pages for reproduction at least in part using a rule indicative of copyright that is determined based on the.

In a third broad form the present invention provides a computer program product for use in reproducing selected pages from at least one document, the computer program product including computer executable code which when executed on a processor in a document processing device, causes the document processing device to:
   a) determine an identity of the at least one document;
   b) display a representation of a number of scanned pages to allow selection of at least some of the scanned pages for reproduction, the scanned pages being determined by scanning at least some of the pages of the at least one document; and, c) control the selection of pages for reproduction at least in part using a rule indicative of copyright that is determined based on the identity.

BRIEF DESCRIPTION OF THE DRAWINGS

An example of the present invention will now be described with reference to the accompanying drawings, in which:—

FIG. 6A is a representation of an example of copyright metadata;

FIG. 6B is a representation of an example of usage information for a reproduction of copyright material made by a user;

DETAILED DESCRIPTION INCLUDING BEST MODE

Figure 1:
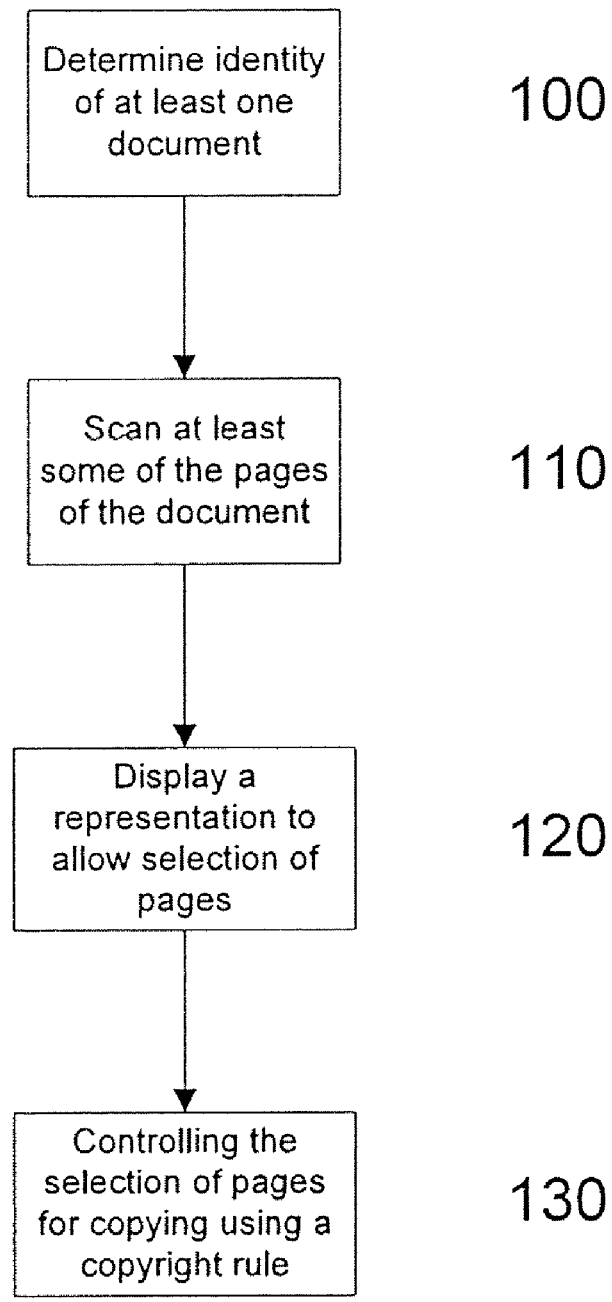
FIG. 1 is a flow chart of an example of a process for use in reproducing pages from one or more documents.

An example of a process for use in reproducing pages from one or more documents will now be described.

In this example, at step 100 an identity of at least one document is determined. This may be achieved in any one of a number of manners. Thus, for example, if the document is a book this can include providing an indication of an ISBN number or other similar identifier. Alternatively this may involve scanning some or all of the pages in the document allowing a document handling device to automatically determine the identity. Alternatively, the identity can be determined based on input commands from a user.

At step 110 at least some of the pages of the at least one document are scanned, with a representation of a number of the scanned pages being displayed at step 120, to allow selection of at least some of the scanned pages for reproduction. The scanning may be achieved in any one of a number of manners, and may be performed remotely, with an indication of the scanned pages being received by a suitable document handling device, such as a computer system, or the like. Similarly, the representation may be displayed in any one of a number of ways, but is typically presented as part of a user interface by a document handling device, or the like, as will be described in more detail below.

At step 130 at least one rule, which may have previously been determined using the identity, is used to control the selection of pages for reproduction. This may be achieved in any one of a number of ways depending on the nature of the rule. Thus, for example, the copyright rule may be a page limit, which places a restriction on the number of pages that can be copied from any one document. In this instance, selection of pages for reproduction can be controlled either by restricting the number of pages that can be scanned, or by restricting the number of scanned pages that can be displayed or selected, thereby ensuring compliance with the page limit.

Thus, for example, the number of pages that can be scanned may be restricted based on the page limit, so that the user can scan a number of pages up to the page limit, with the scanning of further pages being prevented or restricted in some manner.

Alternatively, the scanning of pages itself may not be restricted by the copyright rule, for example if scanning alone does not constitute reproduction within the applicable copyright rules. In this instance, however, the display of scanned images as part of the representation may constitute reproduction, in which case the representation must comply with the copyright rule. Thus, in this instance, regardless of how many pages are scanned, the number of scanned pages provided in the representation is restricted based on the page limit. This ensures not only that the displayed representation complies with the copyright rule, but as the user can only select from displayed scanned pages, this also ensures that the selection of scanned pages complies with the page limit.

As a further alternative, the representation may be displayed in a manner that is not subject to copyright restrictions. This could occur for example if the scanned pages are represented by thumbnail images, which are excluded from copyright in some jurisdictions. In this example, whilst any number of scanned pages may be displayed as part of the representation, the user is restricted from selecting a number of scanned pages that exceeds the page limit, thereby again ensuring copyright compliance.

It will also be appreciated that the above process may be applied to other copyright restrictions and not just page limit restrictions.

The above described process therefore allows pages from a document to be scanned and then displayed in a suitable representation, to allow pages to be selected for reproduction. This process is controlled so as to ensure compliance with copyright requirements at all stages during the selection of pages for reproduction. This can include for example, limiting the scanning of pages, limiting the displaying of the scanned pages in the representation and/or limiting the subsequent selection of scanned pages for reproduction.

The above described process may be performed in any one of a number of manners, and is typically performed at least in part using a document handling device, such as an MFD and/or a computer.

Figure 2:
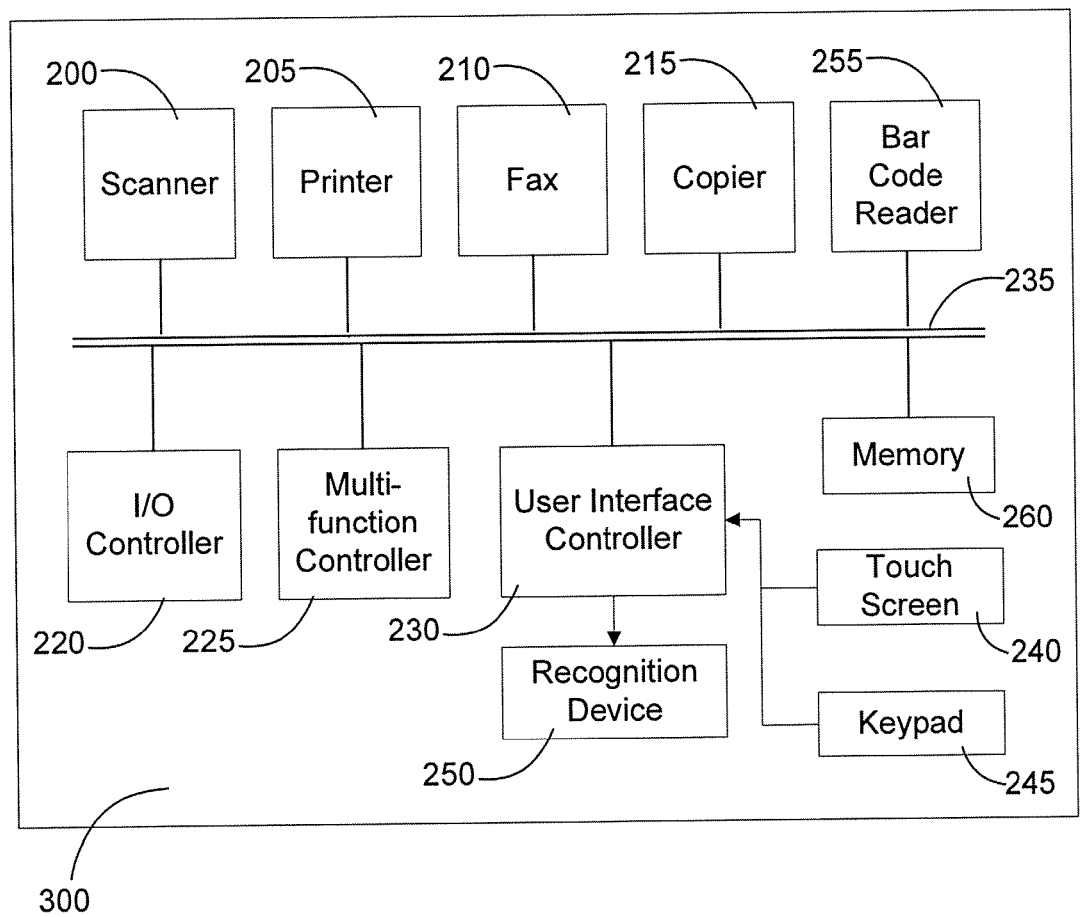
FIG. 2 is a schematic diagram of an example of an MFD.

An example of an MFD is shown in more detail in FIG. 2.

In this example, the MFD includes a scanner 200, a printer 205, a fax 210 unit, an optional dedicated copier 215, an Input/Output (I/O) controller 220, a multi-function controller 225, a user interface controller 230, and an optional memory 260, coupled together via a bus 235, as shown. An optional reader, such as a bar-code reader, may also be provided as shown at 255, to allow the identity to be determined.

The user interface controller 225 is typically coupled to one or more user interface devices, such as a touch screen 240 and keypad 245, to allow a user to view information provided by the MFD 100 and provide appropriate user input commands. A recognition device 250 may also be provided for obtaining information for identifying users. This may include for example a biometric scanning device, or a swipe card or RFID (Radio Frequency Identification) tag reader for reading information from a suitable swipe card or RFID tag.

In use, the I/O controller 220 operates to handle interaction with external devices, such as remote computers, servers, or the like, whilst the multi-function controller 225, operates to control the scanner 200, printer 205, fax 210 and copier 215, to allow desired jobs to be performed. It will therefore be appreciated that the controllers are typically implemented as software executed by a suitable processor, which is operating under control of appropriate software applications stored in a store, such as a memory (not shown).

In particular, in one example, the processes described in more detail below may be performed through the use of a suitable module loaded into the processor from memory, and this is typically implemented by the multi-function controller 225. This may be achieved in any one of a number of manners, but in one example may be achieved using a JAVA module that activates a graphical user interface (GUI) on the touch screen 240, and interacts with remote computers and/or servers as required. This allows the MFD to display information relating to the process, and in particular information relating to copyright restrictions on pages to be copied, as well as to allow the user to provide input commands to control the reproduction process.

Figure 3:
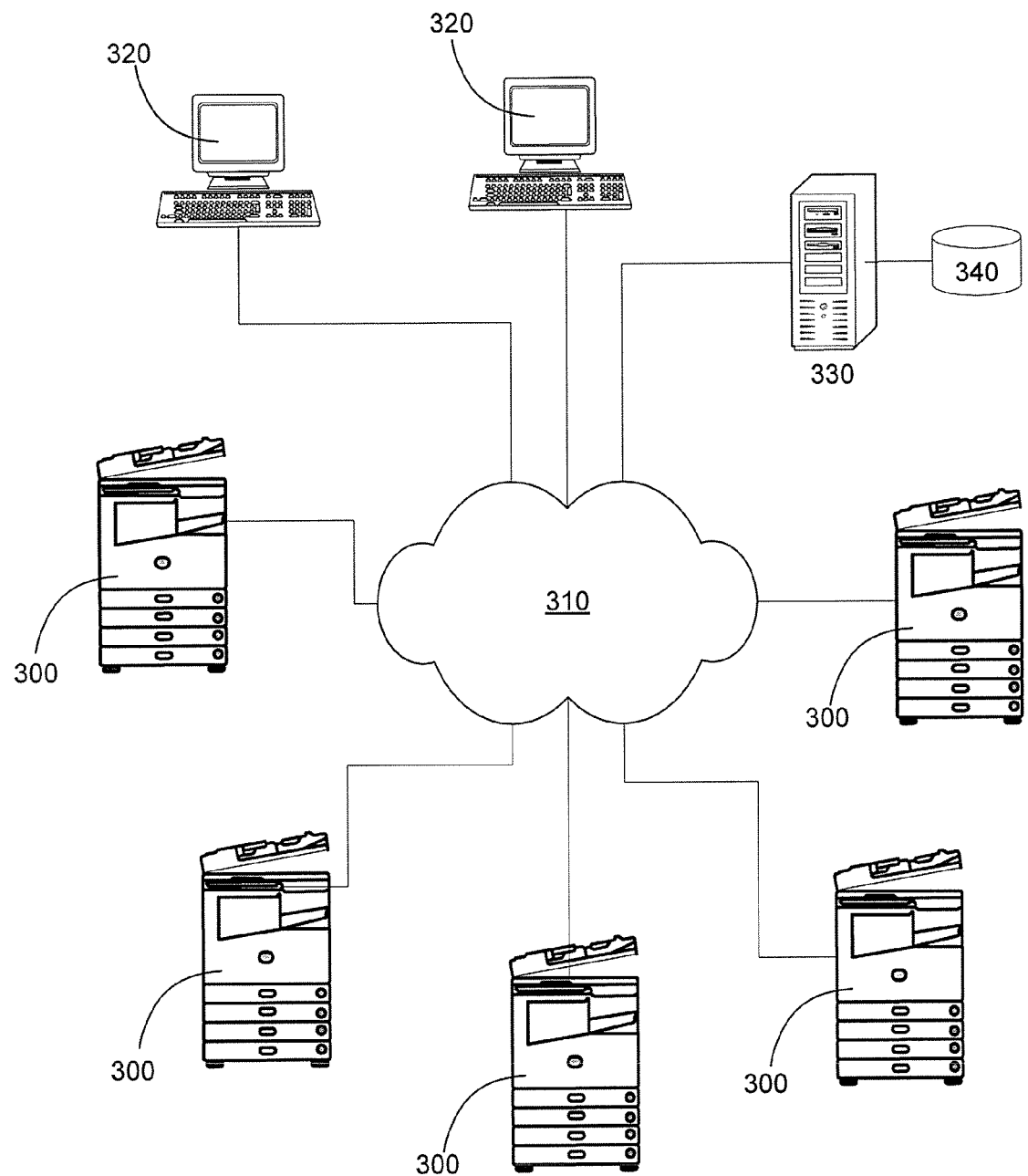
FIG. 3 is a schematic diagram of an example of a networked environment containing a number of MFDs.

In one example, the MFD may be provided in a network environment as will now be described with respect to FIG. 3.

In particular, in this example the network environment includes a number of Multi-Function Devices (MFDs) 300, coupled to a number of computers 320, and optionally a number of servers 330, via a communications network 310. The servers may also be coupled to one or more databases 340, as shown.

In use, the MFDs 300 are used to perform various document handling jobs, such as printing, scanning, copying, reproduction, electronically storing, or faxing of documents, or the like. As part of this process, the computers 320 may be used to provide documents to the MFDs 300, for example in the case of printing applications, or may be used to display job results, for example following scanning of the documents by the MFDs 300. Similarly, the servers 330 may be used to provide or receive documents used in jobs, as well as to provide additional network based activities, such as access to copyright rules relating to documents, and this may require interaction with data in the database 340.

It will therefore be appreciated that a wide range of network architectures are encompassed by the system and the configuration shown is for the purpose of example only. Thus, for example, the communications network may be any suitable communications network, but is typically a Local Area Network (LAN) 310 such as an intranet, although may also include a Wide Area Network (WAN), the Internet, or the like. Furthermore, any number of MFDs 300, computers 320, or servers 330 may be used, and the number shown is for the purpose of illustration only.

Figure 4:
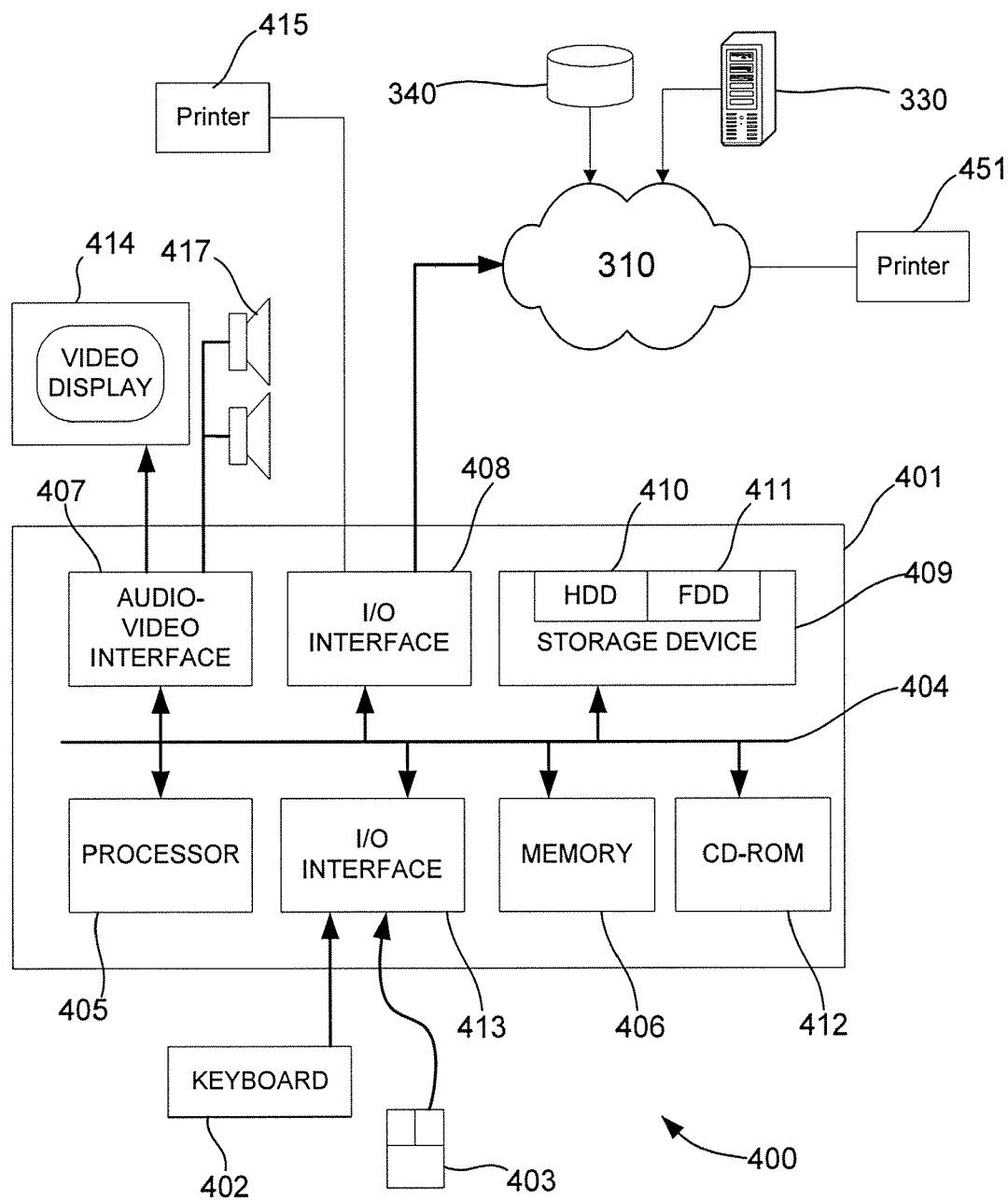
FIG. 4 is a schematic diagram of an example of a computer system.

An example of a general-purpose computer 320 is shown in FIG. 4.

The computer system 400 is formed by a computer module 401, input devices such as a keyboard 402 and mouse 403, and output devices including printers 415, 451, a display device 414 and loudspeakers 417.

The computer module 401 typically includes at least one processor unit 405, and a memory unit 406, for example formed from semiconductor random access memory (RAM) and read only memory (ROM).

The module 401 includes an number of input/output (I/O) interfaces including an audio-video interface 407 that couples to the video display 414 and loudspeakers 417, and an I/O interface 413 for the keyboard 402 and mouse 403 and optionally a joystick (not illustrated). This allows the computer system 400 to determine and interpret user input commands supplied by a user.

An I/O interface 408, such as a network interface card (NIC) is also typically used for connecting to the computer to the computer network 310, which can optionally provide onward connectivity to a network printer 451, the network server 330 and the database 340. The I/O interface 408 can also provide connectivity to a local printer 415.

A storage device 409 is provided and typically includes a hard disk drive 410 and a floppy disk drive 411. A magnetic tape drive (not illustrated) may also be used. A CD-ROM drive 412 is typically provided as a non-volatile source of data.

The components 405 to 413 of the computer module 401, typically communicate via an interconnected bus 404 and in a manner that results in a conventional mode of operation of the computer system 400 known to those in the relevant art. Examples of computers on which the described arrangements can be practised include IBM-computer's and compatibles, Sun Sparcstations or the like.

The process of performing jobs such as printing is typically implemented using software, such as one or more application programs executed within the computer system 400. Typically, the application activates a GUI on the video display 414 of the computer system 400 which displays documents to be printed or scanned, or copied documents.

In particular, the methods and processes are affected by instructions in the software that are carried out by the computer. The instructions may be formed as one or more code modules, each for performing one or more particular tasks. Typically the execution of the instructions may require a number of different application programs to interact, and may also require the presence of a suitable driver that is configured to operate with a specific device or MFD 300. The software may be stored in a computer readable medium, and loaded into the computer, from the computer readable medium, to allow execution. A computer readable medium having such software or computer program recorded on it is a computer program product. The use of the computer program product in the computer preferably affects an advantageous apparatus for distributed printing, scanning, reproducing or copying.

The term "computer readable medium" as used herein refers to any storage or transmission medium that participates in providing instructions and/or data to the computer system 400 for execution and/or processing. Examples of storage media include floppy disks, magnetic tape, CD-ROM, a hard disk drive, a ROM or integrated circuit, a magneto-optical disk, or a computer readable card such as a PCMCIA card and the like, whether or not such devices are internal or external of the computer module 401. Examples of transmission media include radio or infra-red transmission channels as well as a network connection to another computer or networked device, and the Internet or Intranets including e-mail transmissions and information recorded on Websites and the like.

Figure 5:
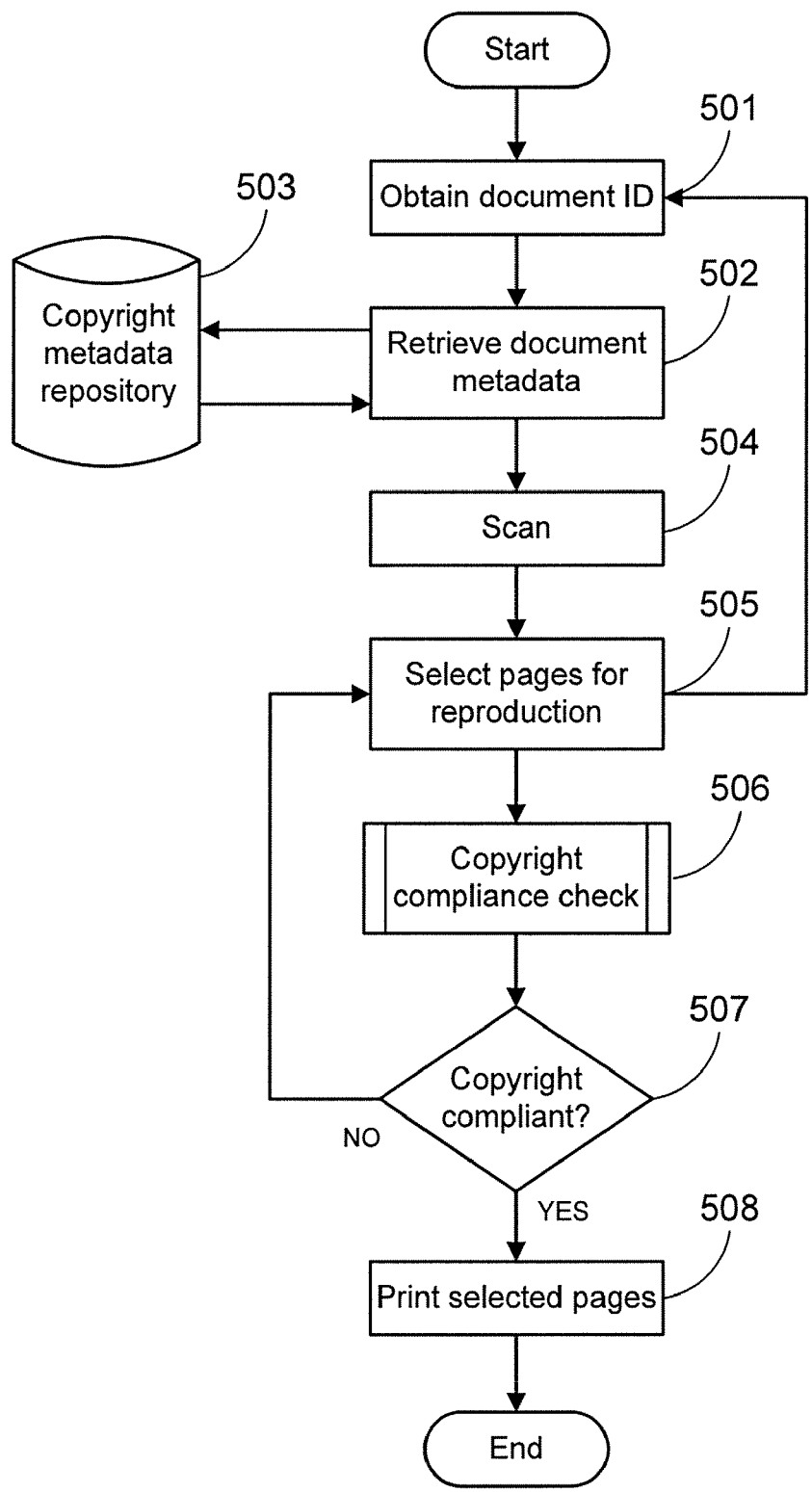
FIG. 5 is a flow chart of a second example of a process for use in reproducing pages from one or more documents.

An example of a process used in reproducing pages from one or more documents will now be described with reference to FIG. 5.

This shows the application flow or logic for a software application deployed on one of the MFDs 300, which typically has scan/print/copy functions, a software platform to provide an interface to the device functions and for extending the functionality of the device with custom applications and network connectivity.

An optional barcode reader 255, which may be built-in, or connected via a USB port or the like, can be used to scan bar-codes provided on documents, allowing software components running on the MFD 300 to determine document identities.

At step 501 the process includes capturing the identity of one or more documents, which in this example is in the form of a document identifier, such as an ISBN/ISSN number, which is usually present on the cover or on the first page of the material. This may be captured by the software application by displaying a soft keyboard on the touch screen 240 for the user, attaching a hard keyboard via USB (or a built-in keyboard), or by using the barcode reader 255. The document identifier can be stored in memory 260 by the software application.

A query of one or more repositories is then typically performed using the document identifier at step 502. The repositories, which may be provided locally within memory 260, in one of the computers 320, the server 330, or in a database 340, contain a library of copyright metadata, associated with corresponding document identifiers, which can be accessed by the MFD 300 at step 503.

If a match on the document identifier is found, the corresponding metadata is returned to the software application executed by the multi-function controller 225. The content and format of the metadata may appear as but not limited to the format shown in FIG. 6A.

In this example, the entry contains information such as the document identifier, in the form of an ISBN, the title of the material, publisher name and issue/edition which aid in identifying the copyright material and also the owner of copyright, so any required royalties can be paid. An indication of associated copyright rules may also be provided. This can be achieved in any one of a number of ways. For example, the metadata may include the rule, such as a copyright limit. Alternatively the metadata may include a reference, such as a link to a rule stored at another location.

It should also be noted that compliance with the copyright rule may depend not only on the nature of the material but also on the intended use of the copied pages. Thus, for example, the copyright limit may be different if the intended usage is educational versus commercial. Accordingly, if this is the case, the multi-function controller 225 may prompt the user for any required information, such as an indication of the intended usage to allow the copyright rule to be correctly applied, or to allow the correct copyright rule to be used in the compliance check. This can be performed during step 501 when the document identifier is determined, or alternatively, at step 503, when the copyright rule is determined.

The metadata can be stored in memory 260 by the software application executed by the multi-function controller 225. A possible intermediate step may be to display part or all of the metadata to the user in an easy to read format, using the touch screen 240. This can be used to prompt the user for confirmation that the document identifier has been correctly recognised by the software application. For example, if the title retrieved from the repository matches that on the physical material then a match has been found.

FIG. 6B shows an example of data that is required to track how the copyright material is reproduced, such as how many pages have been copied and number of copies made, as will be described in more detail below.

In this example, the user is instructed to begin scanning the copyright material to be reproduced at step 504. It is possible to enforce copyright compliance at this step, for example, if a copy limit restriction states that only a fixed percentage or portion of the material may be reproduced. This can be applied to limit the number of permissible scans performed by the device by simply calculating the copy limit from the number of pages of the material retrieved as metadata at 502. In this example, once the copy limit is reached a warning notification may be displayed to the user that additional scans from the same material will be in breach of copyright. The scanned images are held in memory 260 and the print operation for said images is withheld. However, if the copyright rule does not restrict the scanning of pages, any number of pages can be scanned, with copyright compliance being enforced during other stages in the process.

Figure 7:
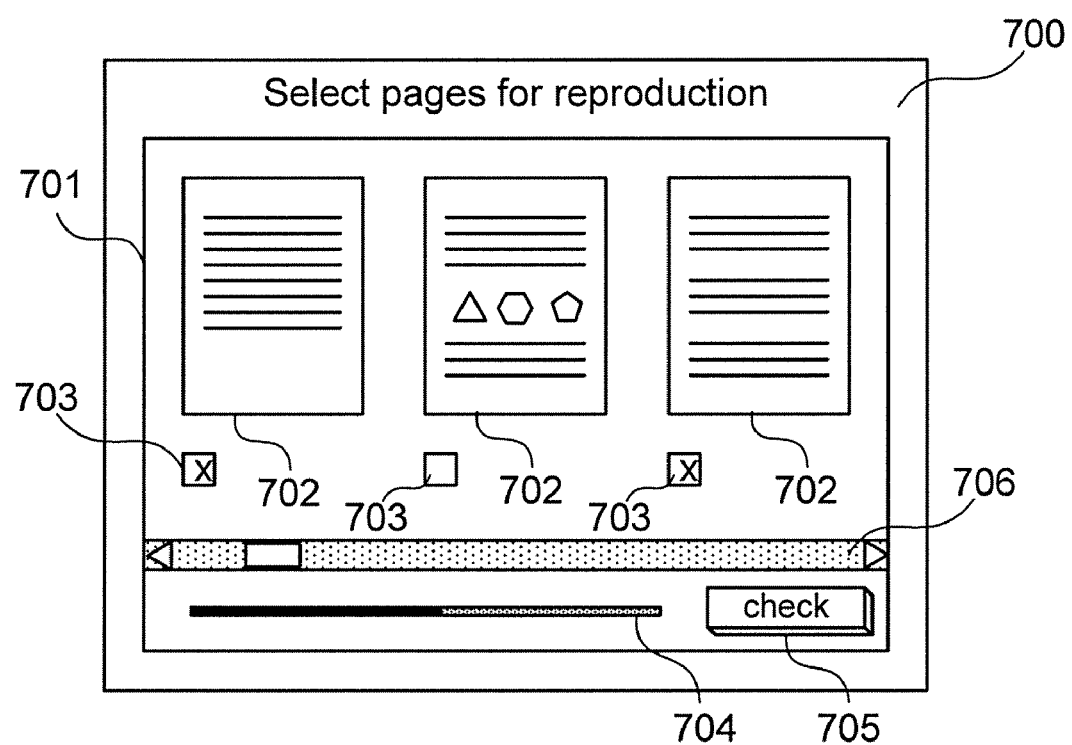
FIG. 7 is a schematic diagram of a user interface for previewing material to be copied.

At step 505, the applications software executed by the multi-function controller 225 causes a representation to be displayed to the user using the touch screen 240. The representation typically displays at least some of the pages, and may optionally indicate whether the pages can be copied. An example representation is shown in FIG. 7.

In this example, representation 700 includes a main viewing window 701 displaying scaled down images of pages, as shown at 702. Due to the limitations on memory and display area, "greeking" can be used to give an approximate visual representation of each page. In this example, the page images 702 are generated directly from the scanned pages stored in the memory 260. To achieve this, the multi-function controller 225 uses the stored image to extract a thumbnail image of the page, and display this to the user together with an optional indication of whether the page can be copied, as determined from the copyright metadata. However, it may not be possible or desirable to generate the representation from scanned pages as the act of scanning itself may be restricted by copyright rules. To overcome this, it may be necessary to generate the page images 702 in some other manner, for example, by having the multi-function controller 225 obtain thumbnail images, or the like, that can be reproduced in accordance with copyright rules, from an alternative data source. This can be achieved by downloading the images from a remote data store, such as from the database 340, the server 330 or the computer 320, using the identity, such as the document identifier. In one example, the user can specify a given range of pages, such that only images for the given range are displayed. Alternatively, images for all pages in the document could be displayed, allowing the user to select pages therefrom. Thus, for example, the thumbnail images could form part of the copyright metadata associated with the document.

In this instance, once the document identifier has been determined and used to obtain the copyright metadata at step 502, this allows the multi-function controller 225 to obtain thumbnail images and generate a representation of pages within the document, prior to scanning at step 504.

Irrespective of how the representation is generated, if the page images 702 are subject to copyright requirements, then this process is controlled to ensure that the representation also complies with copyright requirements. Thus, this may involve limiting the number of page images 702 displayed as part of the representation.

However, if the displaying of page images 702 in the representation is not restricted by copyright, for example if the page images are not covered by copyright, then in this example, any number of page images 702 can be displayed. Thus, the use of low resolution images, such as thumbnail images or the like, can be particularly advantageous as in many situations these can be reproduced without infringing copyright. However, it will be appreciated that any suitable representation may be used.

In any event, the page images 702 allow the user to review each scanned page and select which pages are to be copied. This can be achieved using any suitable input mechanism, such as by checking appropriate check boxes 703, or the like. The representation may then be dynamically updated to reflect the selection of pages by the user. As part of this, a scroll bar 706 may be used to allow different pages images 702 to be viewed.

Thus, in addition to selecting the pages for reproduction, the representation can also provide dynamic feedback during copyright compliance checking on the user's selection. For example, determining a copy limit restriction and comparing the number of selected pages to the limit is an example of a compliance check that can be performed dynamically (while the user is selecting pages). This can be represented visually as a progress bar dialog control 704, or other suitable indication, where the progress indicates the number of pages selected in relation to the copy limit. This provided the user with feedback in the form of a visual indication of the number of remaining pages that can be copied, giving the user a better decision making capacity during selection. Other examples of copyright compliance checks that can be implemented as part of the preview screen can be conceived.

Once the user has reviewed the representation of each page, the user can then select desired pages for reproduction, using the check boxes 703. At any stage during this process, a copyright compliance check may be triggered using a check input button 705.

It will be appreciated that if the scanning or displaying of page images has been restricted to ensure copyright compliance, then no check may be required at this stage, because compliance with copyright is already assured. In particular, if the number of pages displayed in the representation is already limited in accordance with a page limit, then it is not possible for the user to select more pages than those displayed, and hence the page limit is satisfied during reproduction. However, if the representation or scanning steps are not subject to copyright compliance as this is not legally required, then copyright compliance will need to be ensured during the selection process. In this instance, the multi-function controller 225 will control the selection of pages in accordance with the copyright rule to ensure compliance. Thus, if the copyright rule is a page limit, this will involve limiting the number of pages that can be selected, using the page limit.

Each page selected can be recorded in the usage information, shown in FIG. 6B, under the "Pages copied" field. The usage information may also be updated with fee information. Thus, for example, the multi-function controller 225 may determine a fee associated with the pages being copied, and then use this to include an indication of the fee associated with the copied pages in the usage information. Alternatively, the process can be performed by one of the computers 320 or the servers 330, for example after the usage information is finalised and stored by the MFD 300.

It will be appreciated that at this point, the process may return to either step 501 or step 504 to allow further pages to be scanned, either from a different document, or the same document. This allows a single job to involve reproduction of pages from multiple documents, with the at least one rule being used to verify permission to copy pages across the job as a whole. Thus, for example, in the event that the job is preparing a lecture, it may be permissible to copy 10 pages from any one document and up to 50 pages in total. In this instance, the copyright rule can only be verified once all pages are selected for reproduction.

There are some copyright compliance checks that cannot be performed dynamically or would be inefficient, such as checks that require network communication to query remote databases, or the like. For these situations, it is more practical to perform the compliance check as a separate process, as shown at 506. In this example, once the user has decided on the pages to be copied, the copyright compliance verification check is performed, either by applications software executed by the multi-function controller 225, or by a remote processing system, such as server 330 or computer 320. In these latter examples, the list of scanned pages and their associated metadata and usage information is supplied to the computer 320 or server 330, allowing a determination of whether copyright compliance is met. Thus, in the case of a copy limit restriction, a rule may be implemented which takes as input the "total pages" field in the copyright metadata of FIG. 6A and the "pages copied" field in the usage information of FIG. 6B to calculate the percentage of the document selected for reproduction.

At step 507 it is determined if the copyright compliance tests are passed. If so, the process may then involve reproducing the pages, or generating an output indicating a "SUCCESS" status. If there were any failed compliance tests, the result of the test and the reason for failure can be returned as the output of the process.

In either case, the output can be displayed to the user as part of the representation. The user can then return to the representation displayed during step 505 allowing the user to take corrective action, such as changing their selection, if required. Alternatively, the user may return to the scan step 504 to scan additional or alternative pages. This process can be repeated until all copyright compliance tests have passed. The user may also choose to abandon the entire operation in which case the memory buffer containing the document metadata and scanned images will be flushed.

The final step in the application flow is to process the selected pages, allowing these to be output at step 508. This may include printing the scanned images and performing any necessary tracking functions such as storing the metadata and copy settings (number of copies) in a database 340 on the network 310. Alternatively, the scanned images could be sent to a server or print room system where it undergoes additional processing.

The application flow either ends after the scanned images have been processed or may transition back to the start where the user may reproduce another document.

A further example process will now be described with reference to FIGS. 8A and 8B.

In this example, the scan and capture step from the copyright compliance check is split into two processes. The scan and capture of copyright document and associated metadata is performed at the MFD 300 and stored in a remote repository, such as the database 340, while the copyright compliance check is performed using a software application running on a computer 320 or server 330. In this example, the software application executed by the computer 320 retrieves the scanned documents from the database 340, allowing the user to create the content before running the copyright compliance check. This example is useful in the case where the content to be reproduced is made up of document fragments from multiple sources of copyright material.

Figure 8A:
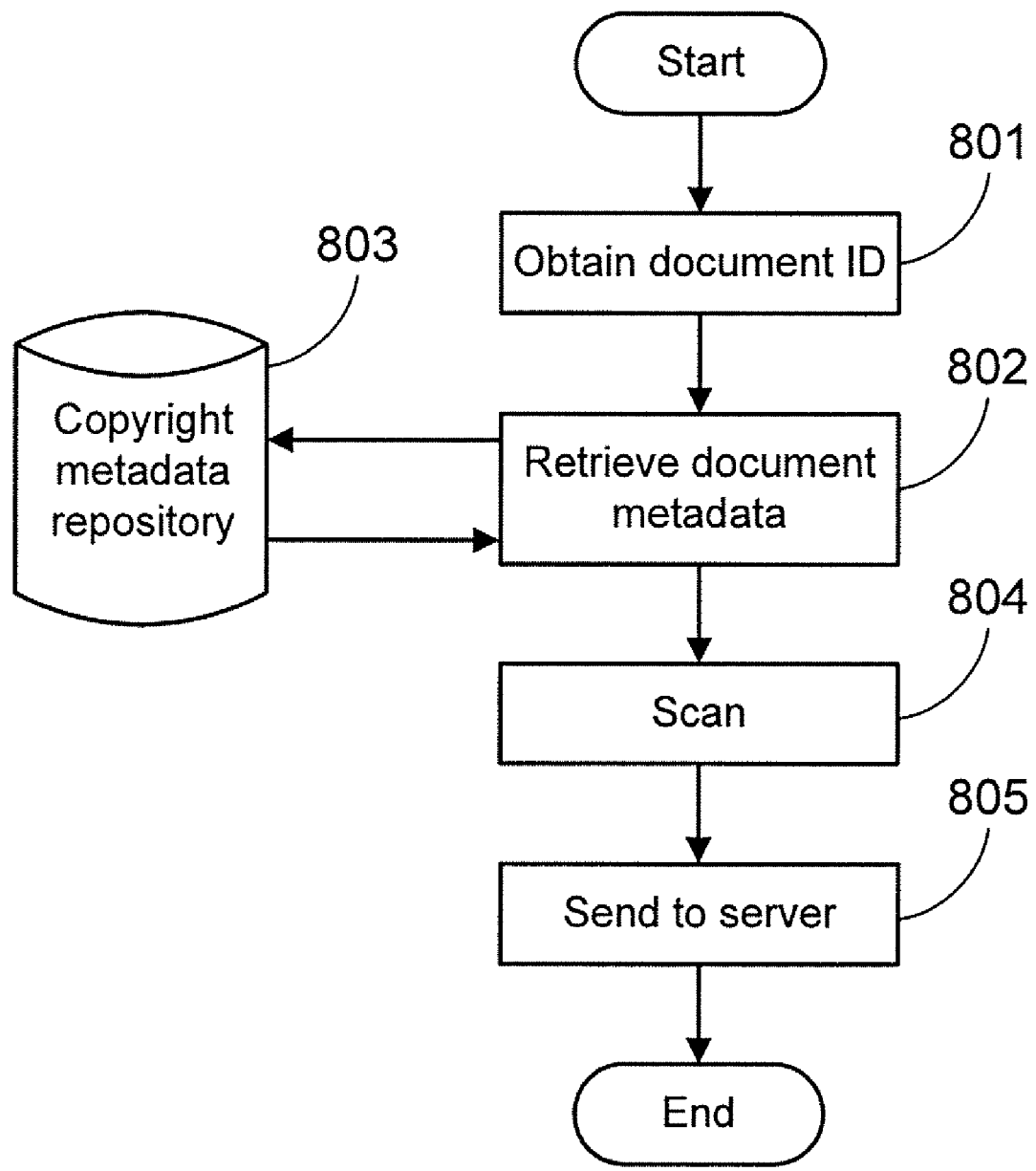
FIGS. 8A and 8B are flow charts of a third example of a process for use in reproducing pages from one or more documents; and, FIG. 9 is an example of an implementation of a user interface for accessing scanned jobs and creating content from scanned copyright material.
Figure 8B:
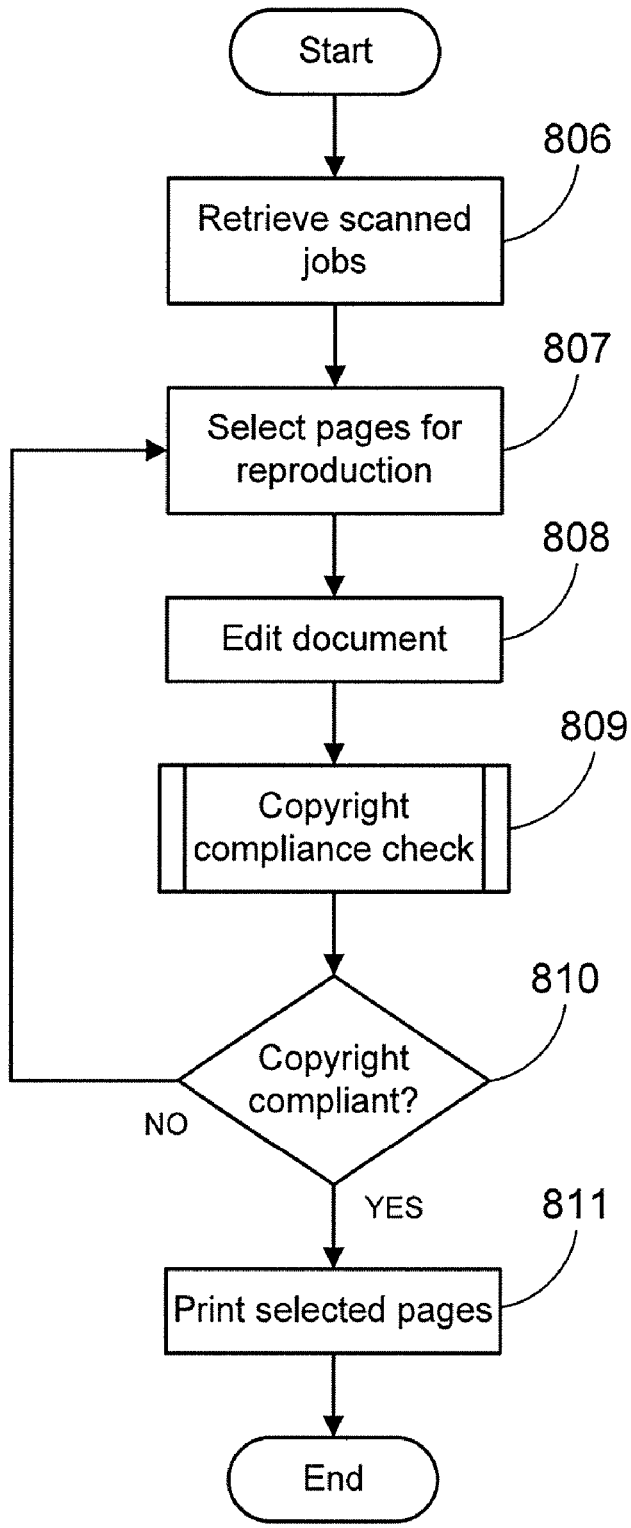

An example of the page capture process performed by the MFD 300 is shown in FIG. 8A. In this example, the software application implemented by the multi-function controller 225 interacts with the user for capturing copyright using at least the steps shown, although additional intermediate steps may also be performed.

The steps include obtaining the document identifier from the copyright material at step 801, retrieving the document metadata from the copyright metadata repository at steps 802, 803 and capturing the scanned images from copyright material at step 804. These steps are therefore similar to steps 501 to 504, as described above, and will not therefore be described in further detail. However, in this example, copyright metadata and scanned images are sent as a "scan job" to the computer 320, a remote server 330, or the database 340, for storage, at step 805.

For example, the scan job may be placed on the user's job queue, stored in a Document Management System (DMS), stored in the user's personal folder, or via Email. To facilitate these methods, the MFD 300 may also need to obtain credentials from the user, such as a user identifier, for determining a correct location or index for the scan job to be stored. In this example, each scan job typically requires an identifier to allow the job to be subsequently retrieved by the user, and this identifier may be provided by the user or auto-generated. The application flow either ends after the scanned images have been sent or may transition back to the start where the user may create and send another scan job.

The user's scan jobs are accessed by a software application on the computer 320 connected to the network 310, at step 806, allowing any scanned jobs to be determined. Once the scanned jobs are determined, the software application or "editor" executed by the computer 320 displays a user interface or other representation similar to that shown in FIG. 9, to allow users to select pages for reproduction from their scan jobs to create a single document.

In this example, user interface 900 includes a scanned jobs window 901 containing a list of all jobs scanned by the user. The scanned jobs window 901 includes an entry 902 for each scan, with the list showing the title of the copyright material or an identifier specified by the user or may be auto-generated (e.g. time of scanning). Selecting an entry 902 in the scanned jobs panel causes the computer 320 to update a preview window 903 with a preview of the scanned pages 904 for that scan job. A scroll bar 908 may also be provided to allow a user to view further scanned pages 904.

At step 807 the user selects pages to be reproduced by checking the appropriate check boxes 905, in a manner similar to that described above with respect to FIG. 7. A copy limit bar, or other compliance check indicator can be displayed at 906, allowing a user to determine compliance with copyright rules.

Some word processor edit functions may also be provided, so that at step 808 the user may edit the content of the pages or document. For example, a page scale function may be added to allow the user to fit multiple pages from the copyright material onto a single page of produced content.

Each operation that alters the content to be reproduced will be updated in the usage information, shown for example in FIG. 6B, for the appropriate scanned job. For example, if the user selects only one page from a scan job to add to the content, only one page will be reported as copied from the copyright material. In the case where the content to be reproduced contains fragments from multiple copyright materials, a list of copyright metadata and usage information is collated for the entire content.

The collated list of copyright metadata and usage information is used to perform a copyright compliance check at step 809, which is similar to that performed at step 506 in the earlier example.

Figure 9:
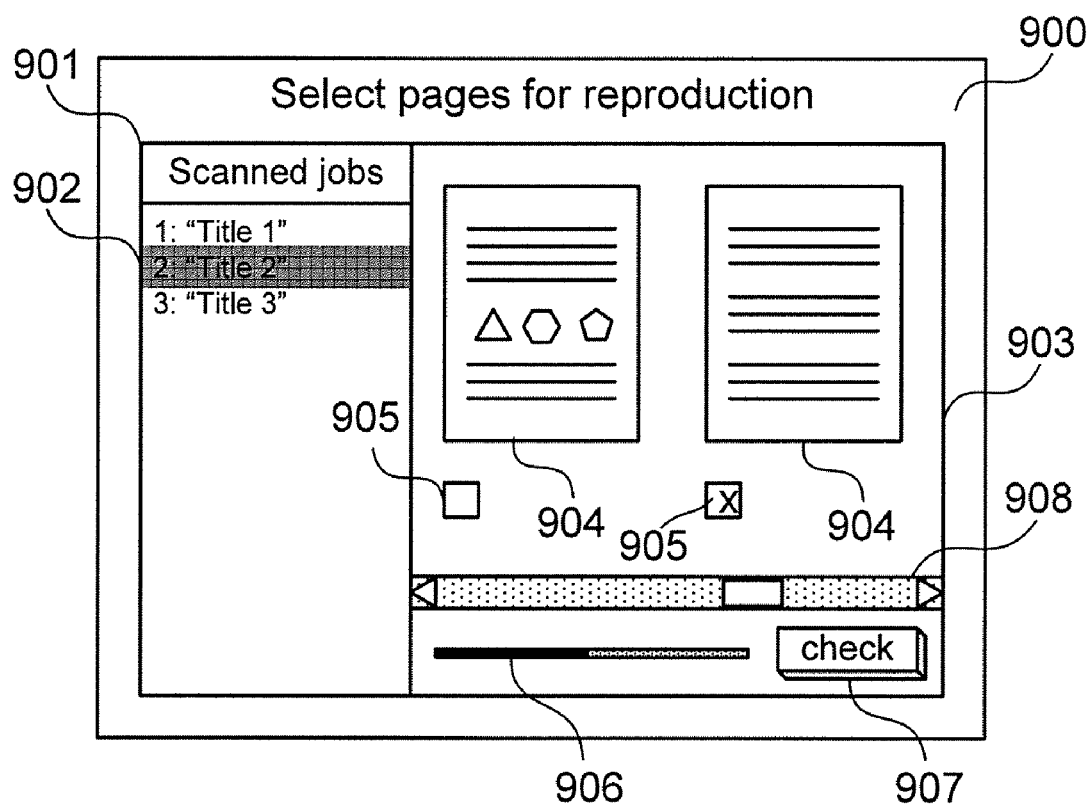

If compliance check fails at step 810, then the editor will return to the selection 807 or edit step 808 and a report on the failed tests will be displayed to the user on the user interface of FIG. 9. This can be used to allow the user to alter the page selection, or other editing operations, to ensure copyright compliance. Once copyright compliance is achieved, the user has the option to print the content 811 or create a "print job" which is stored in a suitable format that contains the content and metadata.

When the content is printed (either immediately or print on demand) the copyright metadata and usage information may be sent to a central facility for tracking of copyright.

In the above example, it is described that the copyright compliance check is only performed at step 810 once the document is edited at step 808. However, it will be appreciated that if the scanning and display processes are also subject to copyright requirements, then additional compliance checks would be performed, for example at steps 804 and 807, to ensure that copyright compliance is maintained throughout the entire procedure.

Additionally, at any time during this process, a check button 907 can be used to manually cause a copyright compliance check to be performed.

Accordingly, the above described process provides a method and system for allowing reproduction of pages of a document to be verified against a rule or set of rules (e.g. copyright) before the pages can be reproduced. This allows copyright compliance of reproductions to be enforced at the scanning device in a way that is convenient (i.e. no delay in reproduction).

The process can also facilitate the tracking of reproductions for calculating royalties to be paid to copyright owners by sending the copyright metadata and usage information to a central system.

The process can also provide an interactive interface at the document processing device to enable the user to select pages in a preview mode before the document is reproduced. The interface can include indicators such as a copy limit bar to assist the user in selecting pages that conforms to copyright.

In the above described examples, it will be appreciated that the MFD operation is typically controlled using a JAVA module executed by an appropriate processor, such as the multifunction controller, although any suitable control mechanism may be used.

In the above described examples, specific reference is made to applications software. However, it will be appreciated that this encompasses installing multiple software applications, elements, or other modules, such as drivers, simultaneously.

The term reproducing is intended to encompass any document processing operation that results in some form of reproduction or copying of pages of a document, either in material or electronic forms. The term therefore encompasses operations such as scanning, reproducing, copying, printing, faxing or e-mailing of pages from documents, as well as to storing pages in electronic form, such as in a memory or the like.

It will be appreciated from this that whilst the above examples have been described with respect to MFDs, the techniques may be applied to any document handling devices that are capable of performing document handling jobs, including jobs that involve reproduction, such as printers, copiers, scanners, facsimile machines, computer systems or the like.

The term document handling device is also understood to encompass any one or combination of the processing systems provided in the network environment, including but not limited to one or more of the computers 320, the servers 330, and/or the MFDs 300.

The foregoing describes only some embodiments of the present invention, and modifications and/or changes can be made thereto without departing from the scope and spirit of the invention, the embodiments being illustrative and not restrictive.

In the context of this specification, the word "comprising" means "including principally but not necessarily solely" or "having" or "including", and not "consisting only of". Variations of the word "comprising", such as "comprise" and "comprises" have correspondingly varied meanings.

The invention claimed is:

1. A method for use in reproducing pages from at least one document, the method including, in a document processing device, the steps of:

a) determining the identity of the at least one document;

b) displaying a representation of a number of scanned pages to allow selection of at least some of the scanned pages for reproduction, the scanned pages being generated by scanning at least some of the pages of the at least one document; and c) controlling the selection of pages for reproduction at least in part using at least one copyright rule that is determined based on the identity of the at least one document.

2. A method according to claim 1, wherein the method further includes in the document processing device the steps of:
   a) determining a page limit using the at least one copyright rule; and
   b) limiting the number of scanned pages displayed in the representation in accordance with the page limit.

3. A method according to claim 1, wherein the method further includes, in the document processing device, the step of controlling the selection of pages for reproduction by:
   a) determining a page limit using the at least one copyright rule; and
   b) limiting the number of scanned pages displayed in the representation in accordance with the page limit.

4. A method according to claim 1, wherein the method further includes, in the document processing device, if the at least one copyright rule does not apply to the representation, the step of controlling the selection of pages for reproduction by:
   a) determining a page limit using the at least one copyright rule; and
   b) limiting the selection of scanned pages displayed in accordance with the page limit.

5. A method according to claim 4, wherein the representation includes a thumbnail image of each of the scanned pages.

6. A method according to claim 5, wherein the method further includes, in the document processing device, the step of determining the thumbnail image from a remote system using the identity of the at least one document.

7. A method according to claim 1, wherein the representation includes an indication of a page limit determined from the at least one copyright rule.

8. A method according to claim 1, wherein the method further includes, in the document processing device, the step of updating the representation in accordance with the selection of scanned pages.

9. A method according to claim 1, wherein the method further includes, in the document processing device, the step of determining the selection of scanned pages in accordance with user input commands.

10. A method according to claim 1, wherein the method further includes, in the document processing device, the step of retrieving copyright metadata from a remote system using the identity of the at least one document.

11. A method according to claim 1, wherein the method further includes, in the document processing device, the step of determining the identity of the at least one document by determining a document identifier for each document.

12. A method according to claim 1, wherein the method further includes, in the document processing device the steps of:
   a) determining an intended use for the selected pages; and
   b) controlling the selection of pages for reproduction at least partially in accordance with the intended use.

13. A method according to claim 1, wherein the method further includes, in the document processing device, the step of determining the identity of the at least one document by at least one of the steps of:
   a) scanning pages in the document;
   b) scanning at least part of the document; and
   c) receiving input commands from an operator.

14. A method according to claim 1, wherein the method further includes, in the document processing device the steps of:
   a) reproducing at least some of the selected pages;
   b) determining the number of pages copied in the reproducing step; and
   c) storing an indication of the number of pages copied.

15. A method according to claim 14, wherein the method further includes, in the document processing device the steps of:
   a) determining a fee associated with the number of pages copied; and
   b) storing an indication of the fee.

16. A method according to claim 1, wherein the reproduction of the scanned pages includes at least one of:
   a) scanning;
   b) printing
   c) faxing;
   d) e-mailing;
   e) copying; and
   f) storing electronically.

17. A method according to claim 1, wherein the method further includes, in the document processing device the steps of:
   a) determining a document identifier associated with the at least one document;
   b) determining the at least one copyright rule using the document identifier;
   c) scanning a number of pages;
   d) displaying a representation of the scanned pages at least partially in accordance with the at least one copyright rule; and
   e) determining the selection of pages at least partially in accordance with user input commands and the at least one copyright rule.

18. A method according to claim 1, wherein the document processing device comprises first and second document processing devices, and wherein the method further includes:
   a) in the first document processing device:
      i) determining the identity of the at least one document;
      ii) determining the at least one copyright rule;
      iii) scanning the pages; and,
      iv) storing an indication of scanned pages and the at least one copyright rule in a store; and
   b) in the second document processing device:
      i) retrieving an indication of the scanned pages and the at least one copyright rule from the store;
      ii) determining the selection of the number of scanned pages; and
      iii) determining whether the selected pages can be copied.

19. An apparatus for reproducing selected pages from at least one document, the apparatus including:
   a document processing device configured to:
      a) determine the identity of the at least one document;
      b) display a representation of a number of scanned pages to allow selection of at least some of the scanned pages for reproduction, the scanned pages being generated by scanning at least some of the pages of the at least one document; and
      c) control the selection of pages for reproduction at least in part using at least one copyright rule that is determined based on the identity of the at least one document.

20. An apparatus according to claim 19, wherein the document processing device further includes a display configured to display the representation of the number of scanned pages.

21. An apparatus according to claim 19, wherein the document processing device further includes a scanner configured to scan pages from the at least one document.

22. An apparatus according to claim 19, wherein the document processing device further includes an input device configured to receive user input commands indicative of a selection of pages.

23. An apparatus according to claim 19, wherein the document processing device further includes a reader configured to determine the identity of the at least one document.

24. An apparatus according to claim 19, wherein the document processing device further includes at least one of:
   a) a multi-function device;
   b) a computer;
   c) a server;
   d) a printer;
   e) a scanner;
   f) a fax machine; and
   g) a reproduction device.

25. A non-transitory computer program product for use in reproducing selected pages from at least one document, the non-transitory computer program product including computer executable code which, when executed on a processor in a document processing device, causes the document processing device to:
   a) determine the identity of the at least one document;
   b) display a representation of a number of scanned pages to allow selection of at least some of the scanned pages for reproduction, the scanned pages being generated by scanning at least some of the pages of the at least one document; and,
   c) control the selection of pages for reproduction at least in part using at least one copyright rule that is determined based on the identity of the at least one document.

* * * * *